Patented Oct. 17, 1939

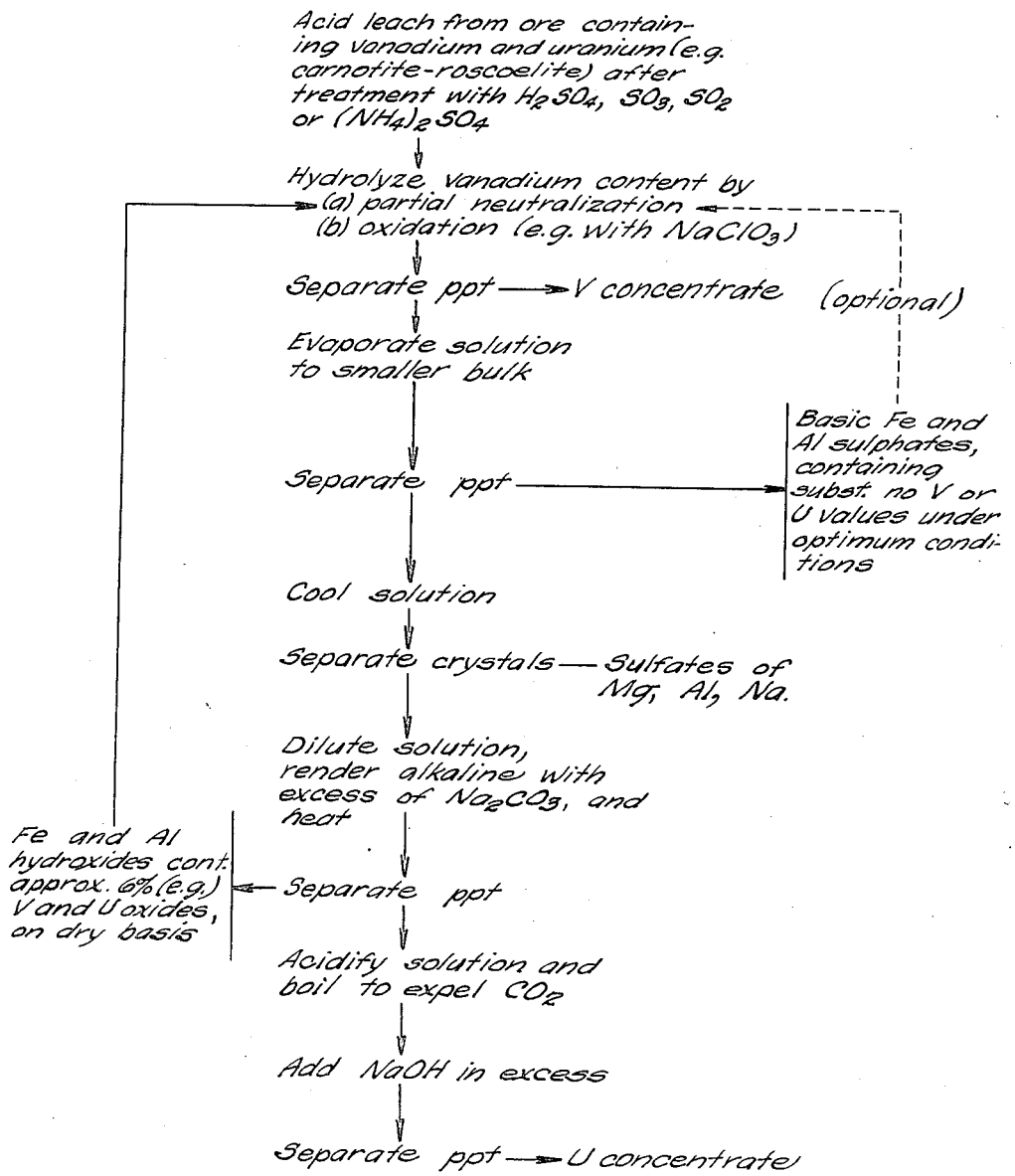

2,176,610

UNITED STATES PATENT OFFICE 2,176,610

PROCESS OF WORKING ORES OF VANADIUM AND URANIUM

Charles J. Stamberg, Cicero, Ill., assignor to North Shore Coke & Chemical Company, Chicago, Ill., a corporation of Delaware Application November 13, 1937, Serial No. 174,495

10 Claims. (Cl. 23—19)

This invention relates to processes of working ores of vanadium and uranium. More specifically, it relates to methods of recovering vanadium and uranium values from acid liquors or solutions obtained by leaching ores which have been subjected to suitable sulphatizing treatment for conversion of the desired values into soluble form, whereby the recovery of values from such leach solutions may be accomplished with greater completeness and efficiency than heretofore and at relatively low operating cost.

In the treatment of ores, sands and concentrates carrying vanadium and uranium values, it has been customary to subject these materials, herein generically termed "ores", to an initial treatment with a suitable sulphatizing agent in order to convert the values into soluble form so that they can be leached from the sulphatized ore. In typical instances, this is accomplished by attacking the ore with sulphuric acid or sulphur dioxide under temperature and other operating conditions well understood in the art and unnecessary to describe in detail here. More recently, sulphatization of such ores has been accomplished by roasting them in mixture with ammonium sulphate.

By whatever specific method the sulphatization is accomplished, the sulphatized ore is leached with water to extract the solubles, the resultant leach solution or liquor being in all cases more or less strongly acid in reaction. After being separated from the residual undissolved ore material and freed of any suspended radium slimes, the clear leach solution is then subjected to appropriate treatment for recovery of the vanadium and uranium values separately. One method of accomplishing this, and the method which it is an object of the present invention to improve upon, involves, in general, hydrolyzation and precipitation of vanadium values by heating the clear leach solution, partially neutralized by addition of an alkaline agent, while subjecting it to the action of an appropriate oxidizing agent, such as sodium or potassium chlorate, chlorine or other suitable material of strongly oxidizing nature, of which many kinds are known in the art; after which the solution from which the vanadium precipitate has been separated is treated to effect removal of impurities, this treatment including the addition of soda ash to precipitate iron and aluminum as hydroxides; uranium values being finally recovered from the purified solution as alkali metal uranate precipitated by adding to the solution an excess of a suitable caustic alkali, such as sodium hydroxide.

Procedures of the type just described have customarily involved losses of vanadium and uranium values which, even though substantial, have heretofore been regarded as unavoidable in practical work. It is a principal object of the present invention to enable marked decrease in such losses, and in many cases substantial elimination thereof, to be accomplished in a practical manner; and in general to render more efficient and economical the recovery of vanadium and uranium values from ores containing them, especially from ores of the character hereinafter referred to as particularly well adapted for working in accordance with the principles of the invention.

In general outline, the new process comprises reducing, but not eliminating, the initial acidity of the leach liquor by adding a neutralizing agent thereto, and hydrolyzing and precipitating vanadium values; subjecting the remaining solution to suitable treatment for removal of impurities, including production of a basic iron-containing precipitate carrying some vanadium and uranium values, which precipitate is utilized, in cycle, in reducing the acidity of the leach liquor as aforesaid; and then recovering uranium values from the purified solution. Furthermore, the purifying treatment is most desirably effected in successive stages, in one of which a considerable part, most advantageously a major part, of the iron and aluminum present in the solution is removed as a basic sulphate precipitate containing little or no vanadium or uranium and hence discardable without loss of values; while, in a later stage, another (desirably a minor) part of the iron and aluminum is precipitated in the form of hydroxides carrying some vanadium and uranium values, this hydroxide precipitate being primarily the basic iron-containing precipitate that is re-cycled to function as an acidity-reducing agent as aforesaid. The basic sulphate precipitate, although more usually discarded wholly or for the most part, and thereby serving as means for removing iron and aluminum from the cycle and preventing them from undesirably accumulating therein, may also be used to any necessary or desired extent in supplementing the acidity-reducing function of the hydroxide precipitate.

By proceeding in this manner, substantial advantages are realized in respect to greater completeness of recovery of vanadium and uranium values and increased purity of the products recovered, the operation as a whole being rendered more efficient, economical and generally satisfactory. In addition to the more complete recovery of values, a substantial saving is effected in the amount of alkaline neutralizing agent, such as soda ash or ammonium hydroxide, otherwise necessary to employ in reducing the acidity of the solution prior to and during precipitation of vanadium values. The invention therefore makes it possible to realize important practical advantages in the commercial working of vanadium and uranium ores, especially low grade siliceous ores of complex character, which are often very difficult to work profitably.

In order to afford a more complete understanding of the principles of the invention, one desirable way of practicing the invention is shown by the accompanying flow sheet or diagram and will be described in detail hereinafter, by way of a concrete illustrative example, but it is to be understood that the invention is not restricted to the specific details set forth and that these may be varied widely within the scope of the invention as defined by the appended claims.

It will be assumed that the novel process is to be applied in connection with the working of a complex siliceous ore of vanadium and uranium of the carnotite-roscoelite type containing, in a typical instance, around 2.5 per cent vanadium pentoxide, and 0.5 per cent uranic oxide, together with approximately 4 per cent aluminum oxide, 2 per cent ferric oxide and somewhat more than 80 per cent silica. The ore is first subjected to appropriate sulphatizing treatment, as by any of the sulphatizing methods hereinabove referred to. It is then leached with water, yielding a sulphate solution of vanadium and uranium values as well as of iron and aluminum. This leach solution is more or less strongly acid in reaction depending upon the character of the ore being worked and the method of sulphatization employed, and, as initially separated from the undissolved ore residue, it ordinarily carries suspended radium-bearing slimes. These latter having been separated from the leach liquor in any suitable manner, the clear leach liquor is then ready for treatment to recover vanadium and uranium values therefrom.

Most desirably, the concentration of the clear leach liquor or extract is such that the vanadium values are present in solution in proportion of about 20 to 40 grams $V_2O_5$ per liter, the concentration being adjusted to approximate the above value either by properly controlling the leaching operation or by diluting the clear leach solution with water, for example. After partial neutralization of the solution or extract to approximately pH 2.0 with iron (and aluminum) hydroxide precipitate obtained at a later stage of the process as will presently appear, a suitable strong oxidizing agent such as sodium chlorate, manganese dioxide, or the like, is added in sufficient quantity to effect the desired complete oxidation and hydrolysis of the vanadium content. The solution is then boiled for a sufficiently long time to ensure satisfactory hydrolyzing and precipitation of the vanadium values. During this operation the acidity of the solution tends to increase, but by adding very gradually more of the iron hydroxide precipitate in the form of a slurry throughout the period of boiling, which may be about one hour in a typical instance, the acidity is so adjusted and maintained that the pH value does not become lower than about 1.0 to 1.1 at the conclusion of the active boiling. The solution is then digested at approximately boiling temperature for about one hour more. The hydrolysis accomplished in this stage of the process yields a vanadium pentoxide precipitate at an hydrolysis efficiency of about 85 to 95 per cent, and the vanadium pentoxide is of about 85 to 95 per cent grade or purity.

In case of necessity, the use of the iron hydroxide precipitate as neutralizing agent in the foregoing operation may be supplemented by also employing some of the basic iron (and aluminum) sulphate precipitate, likewise obtained at a later stage as will presently appear, or some other basic material, such as soda ash, sodium hydroxide, or ammonium hydroxide.

After filtering off or otherwise separating the vanadium pentoxide precipitate, the filtrate is now concentrated by evaporating it to a volume of, say, 1 to 1.5 gallons per 100 pounds of ore. This causes a substantial proportion of the total iron and aluminum content of the solution to be precipitated in the form of insoluble basic sulphates. If it is desired to precipitate the major part of the iron and aluminum at this stage, this may be further facilitated by adding calcium carbonate or sodium carbonate, for example, to bring the pH of the solution to a value as high as 2.2. In any event, provided care is taken not to reduce the acidity of the solution too far, the basic sulphate precipitate carries substantially no vanadium or uranium and therefore, after being filtered and washed hot, it may be discarded. The proportion of the total iron and aluminum content of the solution removed at this stage as basic sulphates is thus controllable and approximately predeterminable to such extent as may be necessary in any given instance, in order to prevent undesirable accumulation thereof in the operating circuit or cycle without incurring loss of vanadium or uranium values. Such an outlet for iron and aluminum from the cycle is required because of the introduction of more of these impurities into the cycle with each batch of fresh leach liquor. In a typical instance, the aforesaid precipitate, consisting largely of basic ferric and aluminum sulphates, may amount to 5 pounds per 100 pounds of ore and, on an air-dried basis, may contain 25 per cent $Fe_2O_3$ and 1.5 per cent $Al_2O_3$.

The hot solution remaining after the basic ferric and aluminum sulphates have been separated by filtration or centrifuging is now further purified preparatory to recovery of uranium values therefrom. By cooling the solution sufficiently, certain contained impurities, consisting chiefly of sulphates of aluminum, magnesium and sodium, are caused to crystallize out, and may be separated by filtration or centrifuging. The separated crystals of these mixed sulphates may amount in a typical instance to between 1.5 and 2.0 pounds per 100 pounds of ore treated. The resultant clear solution or filtrate, which at this stage may have a volume approximating 1 gallon per 100 pounds of ore, for example, is then treated to precipitate its residual content of iron and aluminum as hydroxides. To this end, the solution is diluted extensively, say to from 4 to 6 times its original volume, and soda ash is added thereto in excess, such excess desirably amounting to about 1 pound for each 6 gallons of the diluted solution. The alkaline solution is then agitated and heated for one or two hours, at near the boiling point (e. g. at about 90° C.). This brings down the residual iron and aluminum as a precipitate consisting of the mixed hydroxides and a minor proportion of other impurities, while nearly all the uranium remains in solution. The precipitate, sometimes referred to herein as the "iron hydroxide precipitate", is filtered or otherwise separated from the solution and, after being washed to free it of adhering solution, is utilized, conveniently in the form of a slurry, for adjusting the acidity of the clear leach solution or extract prior to and during precipitation of the vanadium values as hereinabove described. Although it may vary in quantity, depending upon the proportion of iron and aluminum previously removed as basic sulphates, from 6 to 10 pounds (with a water content of 75 per cent) per 100 pounds of ore represents fairly typical practice. This iron hydroxide precipitate carries whatever vanadium values may have escaped hydrolysis in the vanadium-precipitating step, together with any insoluble and adsorbed uranium unavoidably brought down. An average analysis of this precipitate on a dry basis commonly shows a content of about 4 per cent vanadium pentoxide ($V_2O_5$) and about 2 per cent uranic oxide ($U_3O_8$). Such a material is evidently comparable to a good vanadium-uranium ore. Hence the recircuiting of this precipitate in the present process as herein set forth is very desirable and important because it enables recovery of vanadium and uranium values that would otherwise be lost. In addition there is effected substantial economy of operation through eliminating or cutting down the employment of sodium carbonate (soda ash), ammonium hydroxide, or other neutralizing material which would have to be furnished for adjusting the acidity of the leach solution in connection with the hydrolyzation and precipitation of the vanadium values.

To the alkaline filtered or centrifuged solution, now free of iron and aluminum compounds and otherwise sufficiently purified, is next added sulphuric acid until uranium begins to precipitate and the solution is slightly acid. The acidified solution is boiled vigorously until practically all carbon dioxide has been expelled, whereupon there is added to the solution a sufficient quantity of a reagent suitable to convert the uranium values into alkali metal uranate, and precipitate them as such. Such reagent may desirably be a solution of sodium hydroxide employed in quantity supplying about 0.07 pound of NaOH per 100 pounds of ore. After the addition of the sodium hydroxide, the solution is heated to boiling and allowed to stand. The resultant precipitate of sodium uranate is separated, as by filtration, washed, and dried. Its purity is ordinarily between 87 and 96 per cent, and the recovery from the solution is virtually complete.

Owing to the high recovery of vanadium and uranium values attainable in practicing the novel process hereinabove described, and the marked economy of operation effected, the process is particularly well adapted to the treatment of low grade ores of the carnotite-roscoelite type which are ordinarily difficult to work profitably by methods heretofore known.

What is claimed is:

1. In the recovery of vanadium and uranium values from ores containing the same in association with compounds of iron and aluminum, the process which comprises sulphatizing such an ore to solubilize vanadium and uranium values, leaching solubilized values from the sulphatized ore, subjecting the resultant acid leach solution to heat and the action of a suitable oxidizing agent to hydrolyze and precipitate vanadium values therefrom, while adjusting and maintaining the degree of acidity of said acid leach solution within desired limits with the aid, as a neutralizing agent, of a basic iron-containing precipitate obtained at a later stage of the process, separating the resultant vanadium precipitate, subjecting the residual solution to a purifying treatment which includes removal of iron and aluminum as a basic iron-containing precipitate, utilizing such precipitate in cycle as a neutralizing agent in adjusting and maintaining the degree of acidity of a further quantity of said acid leach solution as aforesaid, and recovering uranium values from the residual purified solution.

2. In the recovery of vanadium and uranium values from ores containing the same in association with compounds of iron and aluminum, the process which comprises sulphatizing such an ore to solubilize vanadium and uranium values, leaching solubilized values from the sulphatized ore, subjecting the resultant acid leach solution to heat and the action of a suitable oxidizing agent to hydrolyze and precipitate vanadium values therefrom, while adjusting and maintaining the degree of acidity of said acid leach solution within desired limits with the aid, as a neutralizing agent, of a basic iron-containing precipitate obtained at a later stage of the process and carrying some vanadium and uranium values, separating the resultant vanadium precipitate, subjecting the residual solution to purifying treatment which includes removal of iron and aluminum as a basic iron-containing precipitate carrying some vanadium and uranium values, utilizing such precipitate in cycle as a neutralizing agent in adjusting and maintaining the degree of acidity of a further quantity of said acid leach solution as aforesaid, and recovering uranium values from the residual purified solution.

3. In the recovery of vanadium and uranium values from ores containing the same in association with compounds of iron and aluminum, the process which comprises sulphatizing such an ore to solubilize vanadium and uranium values, leaching solubilized values from the sulphatized ore, subjecting the resultant acid leach solution to heat and the action of a suitable oxidizing agent to hydrolyze and precipitate vanadium values therefrom, while adjusting and maintaining the degree of acidity of said acid leach solution within desired limits by adding thereto a basic iron-containing precipitate obtained at a later stage of the process, separating the resultant vanadium precipitate, subjecting the residual solution to purifying treatment which includes removal of iron and aluminum as successive basic precipitates each containing iron but only one of which carries vanadium and uranium values, utilizing the latter precipitate as a neutralizing agent in adjusting and maintaining the degree of acidity of a further quantity of said acid leach solution as aforesaid, discharging from the cycle the other iron precipitate, and recovering uranium from the residual purified solution.

4. In the recovery of vanadium and uranium values from ores containing the same in association with compounds of iron and aluminum, the process which comprises sulphatizing such an ore to solubilize vanadium and uranium values, leaching solubilized values from the sulphatized ore, subjecting the resultant acid leach solution to heat and the action of a suitable oxidizing agent to hydrolyze and precipitate vanadium values therefrom, while adjusting and maintaining the degree of acidity of said acid leach solution within desired limits by adding thereto a basic iron-containing precipitate obtained at a later stage of the process, separating the resultant vanadium precipitate, subjecting the residual solution to a purifying treatment which includes removal of iron and aluminum as basic iron-containing precipitates obtained in separate stages by precipitation from acid solution and from alkaline solution, successively, the latter precipitate carrying vanadium and uranium values, discharging from the cycle the precipitate from the acid solution, utilizing that from the alkaline solution as a neutralizing agent in adjusting and maintaining the degree of acidity of a further quantity of said acid leach solution as aforesaid, and recovering uranium from the residual purified solution.

5. In the recovery of vanadium and uranium values from ores containing the same in association with compounds of iron and aluminum, the process which comprises sulphatizing such an ore to solubilize vanadium and uranium values, leaching solubilized values from the sulphatized ore, subjecting the resultant acid leach solution to heat and the action of a suitable oxidizing agent to hydrolyze and precipitate vanadium values therefrom, while adjusting and maintaining the degree of acidity of said acid leach solution within desired limits by adding thereto an iron and aluminum hydroxide precipitate obtained at a later stage of the process, separating the resultant vanadium precipitate, concentrating the residual solution to precipitate part of its iron and aluminum content as basic sulphates, separating and discharging from the cycle such basic sulphate precipitate, precipitating substantially all the iron and aluminum content of the residual solution as hydroxides by adding thereto an excess of alkaline precipitant, utilizing this precipitate as a neutralizing agent for adjusting and maintaining the degree of acidity of a further quantity of acid leach solution as aforesaid, and precipitating uranium values as alkali metal uranate from the solution remaining after separation of the hydroxide precipitate.

6. The process as defined in claim 5, wherein said basic sulphate precipitate contains the major part of the total iron and aluminum content of the solution remaining after separating the vanadium precipitate.

7. The process as defined in claim 1, wherein the degree of acidity of the leach solution is adjusted and maintained in the manner stated to give pH values within the approximate range of 1.0 to 2.2.

8. The process as defined in claim 3, wherein the degree of acidity of the leach solution is adjusted and maintained in the manner stated to give pH values within the approximate range of 1.0 to 2.2.

9. The process as defined in claim 5, wherein the degree of acidity of the leach solution is adjusted and maintained in the manner stated to give pH values within the approximate range of 1.0 to 2.2.

10. In the recovery of vanadium and uranium values from ores containing the same, the process which comprises sulphatizing such an ore to solubilize vanadium and uranium values, leaching solubilized values from the sulphatized ore, adjusting the acidity of the resultant acid leach solution to approximately pH 2.0 with the aid, as a neutralizing agent, of an iron hydroxide precipitate obtained at a later stage of the process, subjecting the solution to prolonged heating and the action of a strong oxidizing agent to effect hydrolyzation and precipitating of vanadium values, utilizing such further quantity of said iron hydroxide precipitate during the hydrolyzing operation as may be necessary to prevent the pH value of the solution from becoming substantially lower than about 1.0, separating the resultant vanadium pentoxide precipitate, evaporating the residual solution to a concentration such that a large part of the iron and aluminum content thereof is precipitated as basic sulphates, the pH of said solution being maintained at a value higher than 1.0 but not substantially exceeding 2.2 during such precipitation, separating the resultant basic sulphate precipitate, cooling the residual solution sufficiently to crystallize out sulphates of aluminum, magnesium and sodium and separating the same, then precipitating substantially all the residual iron and aluminum content of the solution by adding soda ash in excess and heating, separating the resultant precipitate consisting largely of iron hydroxide and utilizing the same as a neutralizing agent in connection with the hydrolyzation and precipitation of vanadium values, as aforesaid, from a further quantity of acid leach solution, acidifying and heating the solution remaining after separation of the hydroxide precipitate, and precipitating uranium values therefrom as sodium uranate by adding sodium hydroxide and heating.

CHARLES J. STAMBERG.